US011480609B2

(12) United States Patent
Khalil et al.

(10) Patent No.: US 11,480,609 B2
(45) Date of Patent: Oct. 25, 2022

(54) CAPACITIVE SENSING METHOD FOR INTEGRATED CIRCUIT IDENTIFICATION, AUTHENTICATION, AND TAMPER DETECTION

(71) Applicant: Ohio State Innovation Foundation, Columbus, OH (US)

(72) Inventors: Waleed Khalil, Dublin, OH (US); Michael Charles Kines, Hilliard, OH (US)

(73) Assignee: Ohio State Innovation Foundation, Columbus, OH (US)

(*) Notice: Subject to any disclaimer, the term of this patent is extended or adjusted under 35 U.S.C. 154(b) by 185 days.

(21) Appl. No.: 17/069,930

(22) Filed: Oct. 14, 2020

(65) Prior Publication Data
US 2021/0110073 A1  Apr. 15, 2021

Related U.S. Application Data

(60) Provisional application No. 62/914,606, filed on Oct. 14, 2019.

(51) Int. Cl.
 *G01R 31/28* (2006.01)
(52) U.S. Cl.
 CPC ............... *G01R 31/2851* (2013.01)
(58) Field of Classification Search
 None
 See application file for complete search history.

(56) References Cited

U.S. PATENT DOCUMENTS

| 2015/0219714 A1* | 8/2015 | Hamilton ............ G06F 21/73 702/65 |
| 2021/0066214 A1* | 3/2021 | Das ................... H01L 23/5225 |

OTHER PUBLICATIONS

S. Ohkawa, M. Aoki and H. Masuda, "Analysis and characterization of device variations in an LSI chip using an integrated device matrix array," in IEEE Transactions on Semiconductor Manufacturing, vol. 17, No. 2, pp. 155-165, May 2004, doi: 10.1109/TSM.2004.827001.
H. Omran, A. Alhoshany, H. Alahmadi and K. N. Salama, "A 33fJ/Step SAR Capacitance-to-Digital Converter Using a Chain of Inverter-Based Amplifiers," in IEEE Transactions on Circuits and Systems I: Regular Papers, vol. 64, No. 2, pp. 310-321, Feb. 2017, doi: 10.1109/TCSI.2016.2608905.

(Continued)

*Primary Examiner* — Anh Q Tran
(74) *Attorney, Agent, or Firm* — Meunier Carlin & Curfman LLC

(57) ABSTRACT

Systems and methods are provided for Integrated Circuit (IC) identification, authentication, and tamper detection. Die identification, authentication, and tamper detection techniques are described that employ capacitive sensing of on-chip interconnect. The signal and power routing in ICs have nominal capacitance values that are characteristic of their foundry, and the variance of these values, due to process tolerances, is unique to each device. Measuring these capacitances provides not only support for determining the authenticity of the device and fabrication site, but also provides distinct identification of each part. By integrating Capacitance-to-Digital Converters (CDCs) with low power and area overhead, capacitance values from intrinsic functional nets can be reported, and the need for separate additive test circuitry can be avoided.

20 Claims, 8 Drawing Sheets

(56) References Cited

OTHER PUBLICATIONS

H. Xin, M. Andraud, P. Baltus, E. Cantatore and P. Harpe, "A 0.1-nW-1uW Energy-Efficient All-Dynamic Versatile Capacitance-to-Digital Converter," in IEEE Journal of Solid-State Circuits, vol. 54, No. 7, pp. 1841-1851, Jul. 2019, doi 10.1109/JSSC.2019.2902754.

* cited by examiner

CAPACITIVE SENSING METHOD FOR INTEGRATED CIRCUIT IDENTIFICATION, AUTHENTICATION, AND TAMPER DETECTION

CROSS-REFERENCE TO RELATED APPLICATIONS

This application claims the benefit of U.S. provisional patent application No. 62/914,606, filed on Oct. 14, 2019, and entitled "CAPACITIVE SENSING METHOD FOR INTEGRATED CIRCUIT IDENTIFICATION AND AUTHENTICATION," the disclosure of which is expressly incorporated herein by reference in its entirety.

BACKGROUND

Hardware security in Integrated Circuit (IC) designs is of increasing importance in dealing with the insecure, expanding global supply chain of these parts. The ability to trace the origin of a die, combined with the capability to uniquely identify each die provides valuable quantitative measures of trust in the device's proper operation and performance. Additionally, self-detection of die tampering and/or malicious circuit insertions (e.g., trojans) provides a continuing measure of hardware trust throughout a device's operation in an uncontrolled environment.

Some specialized applications in hardware security rely on expensive, protective top layer coatings of randomly distributed conductive particles within a dielectric material to encapsulate a die. These randomly distributed conductive particles form unique capacitances which are measured by the underlying die to form a unique, unpredictable identification value. Any attempts to cut through this protective top layer to modify the die underneath will alter the capacitances and therefore the identification value. While this method helps to prevent malicious insertions or modifications after die fabrication and encapsulation, it does not provide any information on the origin fabrication facility nor does its unique identification rely on the traditional process steps of IC production, hence adding extra cost.

Other applications in hardware security utilize single-bit, differential measurement of capacitances formed through special layout of metal lines within the top metal layers of the die. These practices are impractical due to the extremely unwieldy area overhead in the metal layer routing and the lack of security in single-bit, differential outputs. These methods do not provide any trace to the origin of the die fabrication nor do they reveal the presence of circuit tampering during the original fabrication of each device. Circuit tampering attempts made after die fabrication are only detected if the tampering happens to reverse the polarity of the differential capacitance measurement. Thus, many alterations would remain undetected.

The majority of conventional techniques in this domain are focused on die identification rather than die authentication. In other words, a die may have a serial number that uniquely identifies it, and therefore differentiates it from all other dies, but that serial number does not provide traceability nor authentication for that die's origin of fabrication. One example such methods of identification-only in ICs is Physically Unclonable Functions (PUFs).

It is with respect to these and other considerations that the various aspects and embodiments of the present disclosure are presented.

SUMMARY

The systems and methods described herein remove the drawbacks associated with previous systems and methods. Certain aspects of the present disclosure relate to authenticating each die's origin and uniquely identifying each die with an intrinsic unclonable value through high-resolution measurement of on-chip capacitance values and Resistor-Capacitor (RC) time constants. Malicious tampering with Back-End-Of-Line (BEOL) metallization may also be detected.

Capacitance and/or RC time constant values may be used to determine that a specific die was fabricated at a particular foundry. These self-reported capacitances and/or RC time constants provide evidence to authenticate the die's origin whereas traditional identification methods do not.

In an implementation, a method of die authentication of an IC comprises: performing self-testing of at least one of an on-die capacitance or an RC time constant on a die of the IC to generate self-reported results; receiving the self-reported results from the die at a computing device; and determining whether the die is authentic using the self-reported results and generating a determination.

In an implementation, a method of die identification of an IC comprises: performing self-testing of at least one of an on-die capacitance or an RC time constant on a die of the IC to generate self-reported results; receiving the self-reported results from the die at a computing device; and uniquely identifying the die using the self-reported results and generating an identification.

In an implementation, a method of die tamper detection of an IC comprises: performing self-testing of at least one of an on-die capacitance or an RC time constant on a die of the IC to generate self-reported results; receiving the self-reported results from the die at a computing device; and determining whether the die is tampered using the self-reported results and generating a determination.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
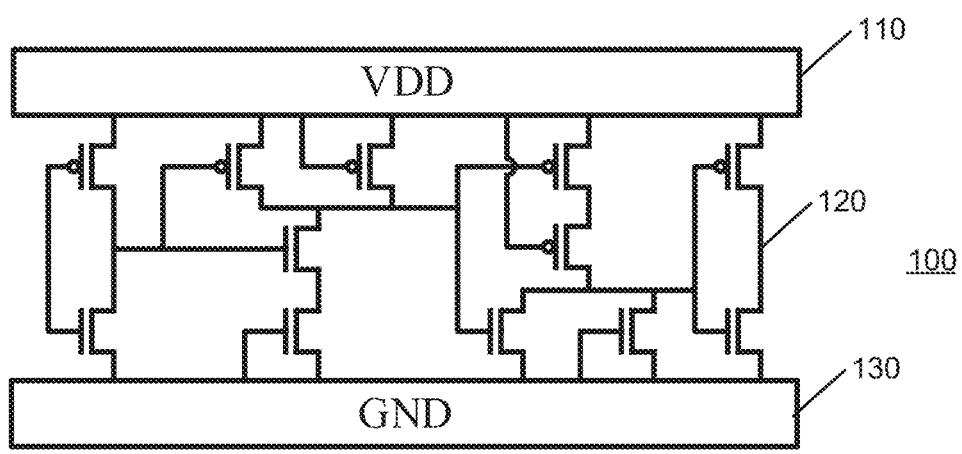
FIG. 1 is an illustration of a digital flow layout with VDD and GND lines running parallel with circuit elements between them.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In some aspects, systems and methods are provided for IC authentication, identification, and tamper detection. Die authentication, identification, and tamper detection techniques are described that employ capacitive and resistive sensing of on-chip interconnect. The signal and power routing in ICs have nominal capacitance and resistance values that are characteristic of their foundry, and the variance of these values, due to process tolerances, provides a unique set of capacitance and resistance values for each device. Measuring these capacitances and resistances provides not only support for determining the authenticity of the device's origin, but also provides distinct identification of each part.

Measuring the capacitances and resistances inherent to the functional circuit provides critical insight into circuit tampering as well. Tampering in the form of routing alterations or malicious circuit insertions will noticeably alter the capacitances and resistances that are measured. Because measured parameters are characterizing nodes within the functional circuit rather than special auxiliary wrapping, such implementations provide more direct, accurate evaluation of circuit tampering. Notably, this anti-tampering detection is performed without the need for any additional post-processing coating or encapsulation steps, which are costly to the manufacturers.

By integrating Capacitance-to-Digital Converters (CDCs) with low power and area overhead, capacitance values from intrinsic functional nets can be reported, and the need for separate additive test circuitry can be avoided. Integrating RC time constant quantizer circuits extends measurements by including resistance into the measured entities.

FIG. 1 is an illustration of a digital layout referred to as circuit 100 with VDD and GND lines 110, 130 respectively, running parallel with circuit elements 120 between them. These components (the circuit elements 120) form parasitic capacitances and resistances as illustrated in FIG. 2.

Utilizing process specific characteristics of an IC fabrication facility (also known as a foundry) along with uncontrollable random variations from die-to-die production, methods are provided to authenticate each die's origin and uniquely identify each die with an intrinsic unclonable value by measuring on-chip capacitance values, resistance values, and/or RC time constants. Each foundry has a specific process flow, which includes a unique recipe for metal layer thicknesses, widths, and choice of dielectric type and thickness of each dielectric layer, that results in different distributions of capacitance and resistance formed as a result of interconnect metal layer routing. These capacitive and resistive distributions relay foundry-specific information. This information can be used to authenticate the origin of a particular IC. All foundry processes have uncontrollable random variations that manifest themselves in differing values of capacitance and resistance within the metal routing on the die. Measuring these capacitance and resistance values of these lines provides a unique, unclonable identification for each die.

Figure 2:
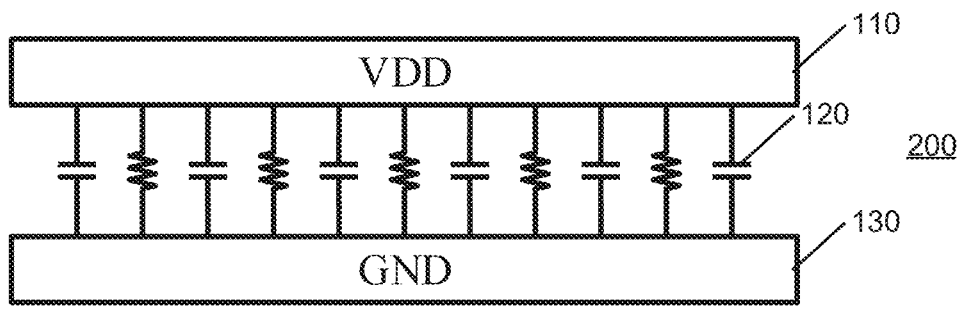
FIG. 2 is an illustration showing the effective circuit seen between VDD and GND of FIG. 1 when idle (e.g., not switching)

FIG. 2 is an illustration showing an effective circuit 200 of the circuit 100 when the circuit 100 is idle (e.g., the circuit elements 120 are not switching). There is parasitic capacitance and associated leakage resistances that form along this effective circuit 200. This is intrinsic to the circuit 200 (and thus the circuit 100). This can be used to identify, characterize, and/or authenticate the circuit 100, as described further herein.

The on-chip power routing networks are tied to digital logic gates that manifest themselves as resistive leakage paths from the supply to ground when the gates are turned off. This parasitic resistance couples with the supply rail capacitance to form RC time constants that possess foundry specific distributions with unique values for each die. An RC time constant measurement supports low-overhead identification and authentication of devices.

Figure 3:
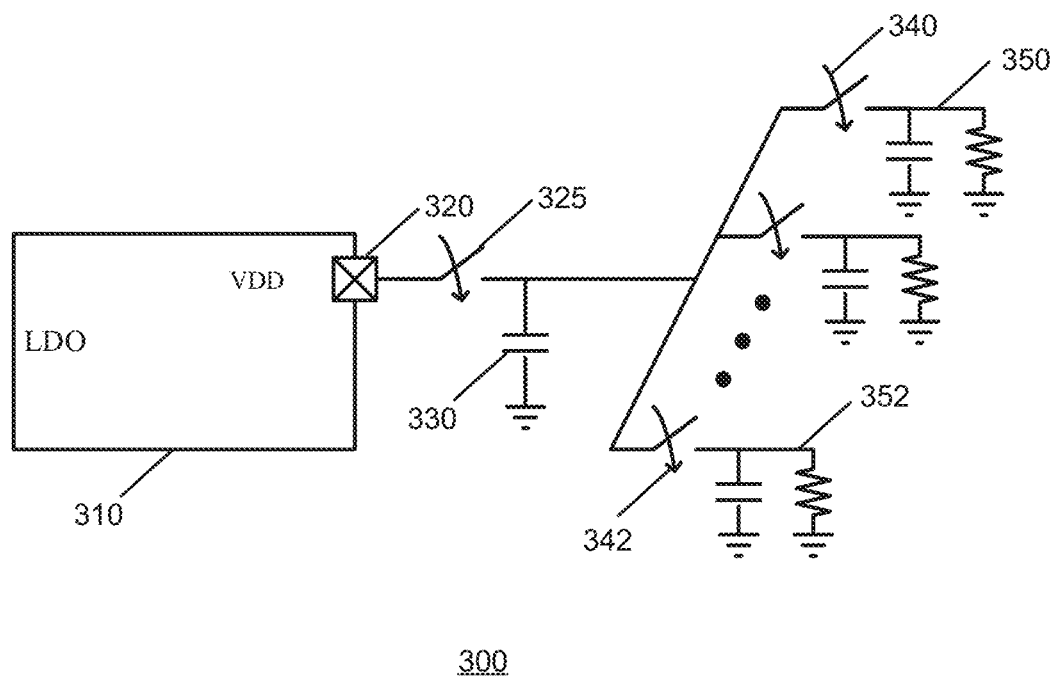
FIG. 3 is an example circuit useful for explaining various aspects of embodiments.

FIG. 3 is an example circuit 300 useful for explaining various aspects of embodiments. A low dropout linear regulator (LDO) 310 provides voltage VDD to a circuit through a power-gating switch 325. Decoupling capacitance is shown as 330.

Subcircuit power supply lines 350, . . . , 352 (but not limited thereto) are shown with switch connections 340, . . . , 342 (but not limited thereto) to each. It is contemplated that there may be an increase of parasitic resistance in the switches which may negatively impact circuit operation. This may be mitigated using large power gating switches and/or by applying decoupling capacitance for each subcircuit (at the expense of area).

The instantiated power lines for both digital and analog operations may be used in accordance with the techniques described herein. By recognizing that these lines contain more than just capacitance (e.g., parasitic resistance), more bits of entropy can be extracted through characterization of the RC time constant as well as the total capacitance. Thus, the parasitics and leakage, which are byproducts of the IC layout, may be used to authenticate, identify, and detect tampering of the die.

Figure 4:
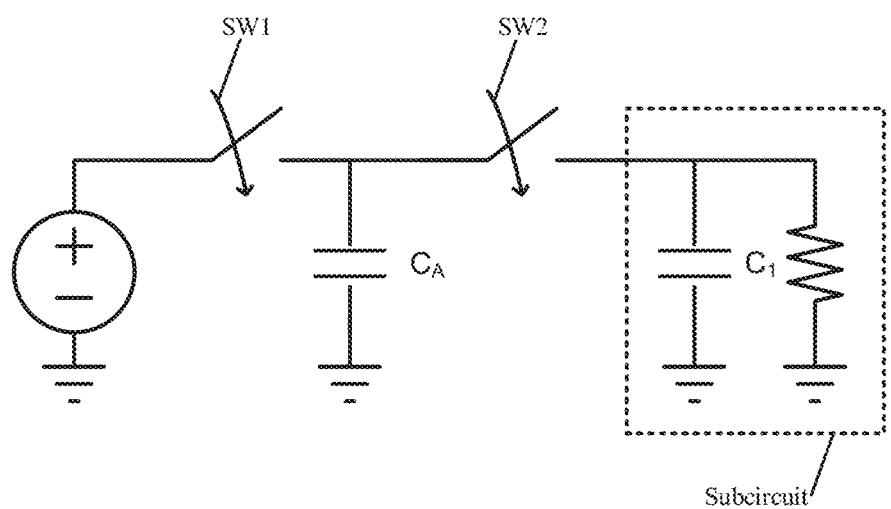
FIG. 4 is an illustration showing the effective circuit of FIG. 3.
Figure 5:
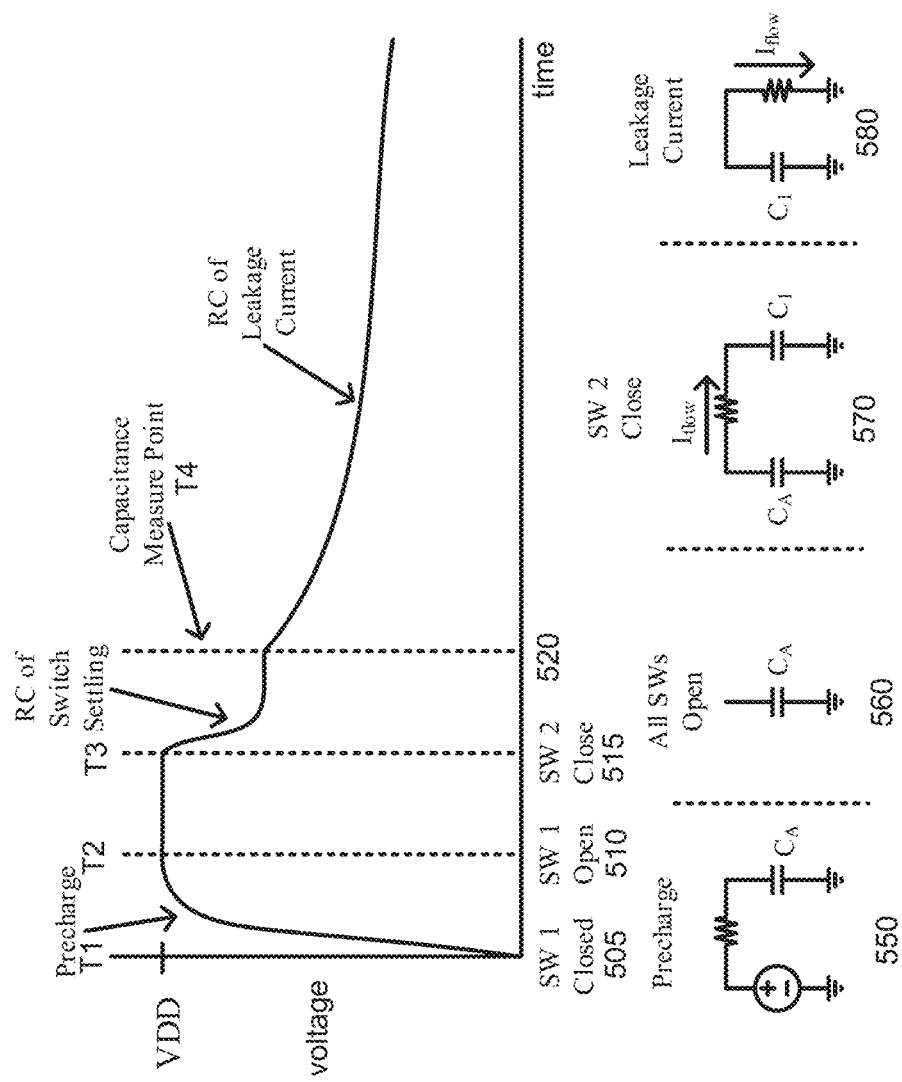
FIG. 5 is a diagram showing aspects of operation according to the embodiment in FIG. 3.

FIG. 4 is an illustration showing the effective circuit of FIG. 3, and FIG. 5 is a diagram 500 showing aspects of operation according to the embodiment in FIG. 3. Stages of operation with circuit highlights are also shown. The switch SW1 and the switch SW2 shown in FIG. 4 correspond to the first switch SW1 and a second switch SW2 in FIG. 5. Likewise, the capacitances $C_A$ and $C_1$ shown in FIG. 4 correspond to the capacitances $C_A$ and $C_1$, respectively, in FIG. 5.

Starting at time T1 (505), SW1 is closed allowing the capacitance $C_A$ to precharge to voltage level VDD. This precharge stage of operation is represented by the circuit 550.

At time T2 (510), the first switch SW1 is opened. Thus, all switches (e.g., the first switch SW1 and a second switch SW2) are open at this point. This stage of operation with all switches open is represented by the circuit 560.

At time T3 (515), the second switch SW2 is closed. The voltage then begins to drop with the RC of the switch settling. This stage of operation is represented by the circuit 570.

At time T4 (520), the capacitance is measured. Thereafter, the RC time constant of the leakage current may be measured. This stage of operation is represented by the circuit 580. This decay acts as a signature parameter, and is used in the process characterization and can be used to uniquely identify a part from a particular foundry. The decay, and thus the signature parameter(s) are very sensitive to tampering. Tampering will lead to a large change in the measured RC time constant that can be used to detect die tampering.

Figure 6:
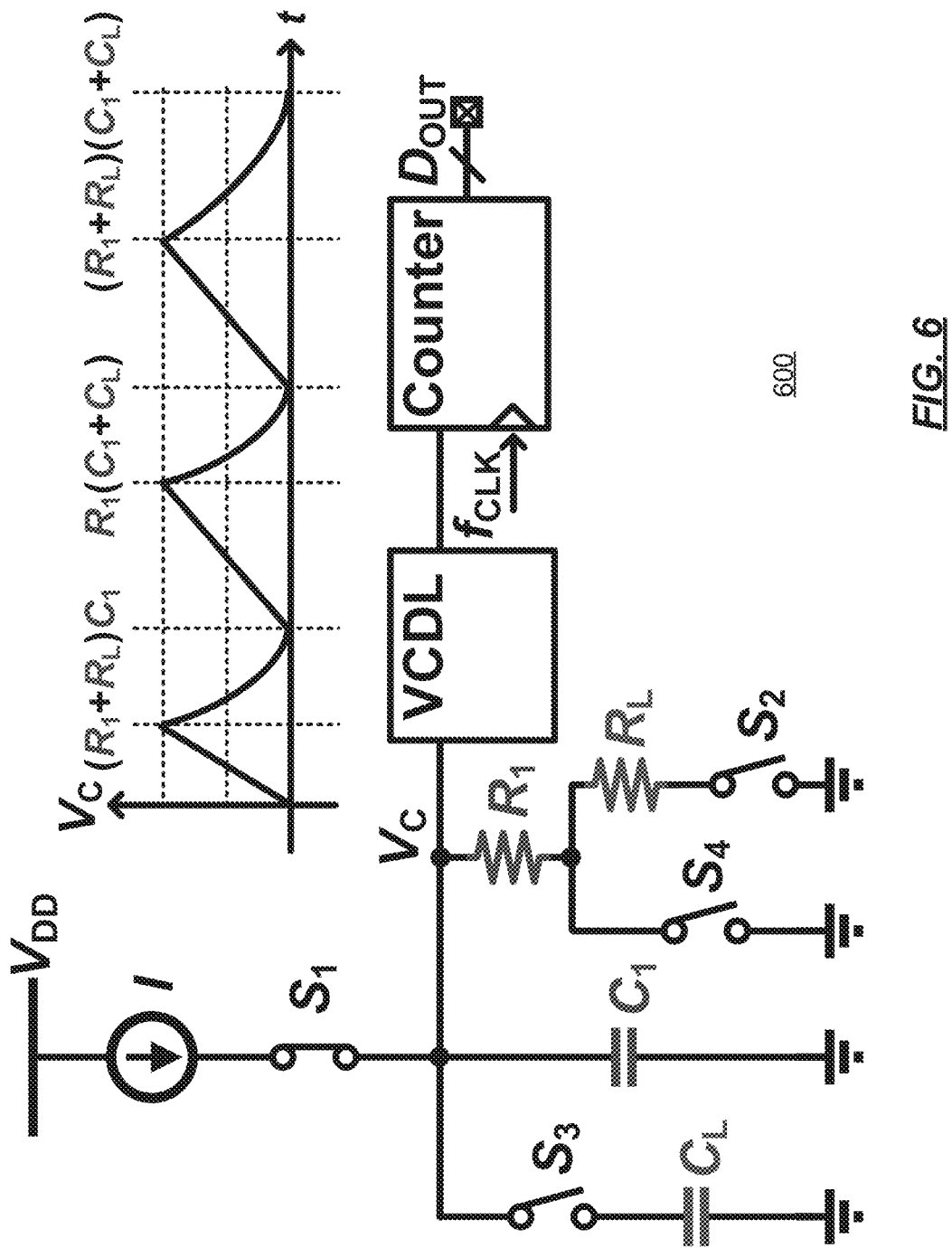
FIG. 6 is a diagram of an implementation of a circuit designed to measure the RC time constants of nets within an IC.

FIG. 6 is a diagram 600 of an implementation of an example circuit designed to measure the RC time constants of intrinsic functional nets within an IC. It is noted that this measurement circuit is not intended to be limiting and is provided as an example only. Additional or alternative measurement circuits may be used depending on the implementation.

One of the challenges of resistive and capacitive measurements is accuracy of the measurements when the resistance and/or capacitance is small. To alleviate this challenge, an additional test-aid capacitance and resistance, $C_L$ and $R_L$, respectively, may be added to the circuit. This test-aid capacitance and resistance, $C_L$ and $R_L$, are substantially larger than the capacitance and resistance, $C_1$ and $R_1$, that are intended to be measured. A three-part measurement cycle described below allows for the accurate derivation of the time constant formed from resistor $R_1$ and capacitor $C_1$, $R_1C_1$, without directly measuring this value, which would be difficult to do accurately given the small size of these elements.

In part one, switch $S_1$ is closed (with all other switches open), allowing current source I to store charge on the capacitance $C_1$ which manifests itself as a voltage on node Vc. This charge is then discharged through $R_1$ in series with $R_L$ by opening switch $S_1$ and closing switch $S_2$. As the charge is dissipated, the RC time constant is then measured with a Voltage Controlled Delay Line (VCDL) and Counter which forms a digital binary output, Dout. Once the charge on $C_1$ is fully depleted, switch $S_2$ can be opened completing the first part of the measurement cycle.

In part two, switch $S_3$ can be closed connecting $C_L$, and switch $S_1$ can be closed again to allow the charging current to be applied to the parallel combination of $C_1$ and $C_L$. Once the predetermined charging time has expired, switch $S_1$ is opened and switch $S_4$ is closed, allowing the stored charge to discharge through resistor $R_1$. The time constant of this discharge can again be measured with the VCDL and Counter resulting in the digital binary output Dout. When the charge is fully depleted, switch $S_4$ can be opened completing part two of the measurement cycle.

In part three, switch $S_1$ is closed to begin charging $C_L$ and $C_1$ (as switch $S_3$ has remained closed). Once the predetermined charging time has expired, switch $S_1$ is opened and switch $S_2$ is closed, allowing the stored charge to discharge through the series combination of resistors $R_1$ and $R_L$. This final time constant is measured by the VCDL and Counter to produce a final digital output value Dout.

The three RC time constants gathered in this three-cycle measurement form a system of three equations that can be used to solve for the desired time constant $R_1C_1$, which is much shorter due to the smaller values of resistance and capacitance making it difficult to measure by itself.

Figure 7:
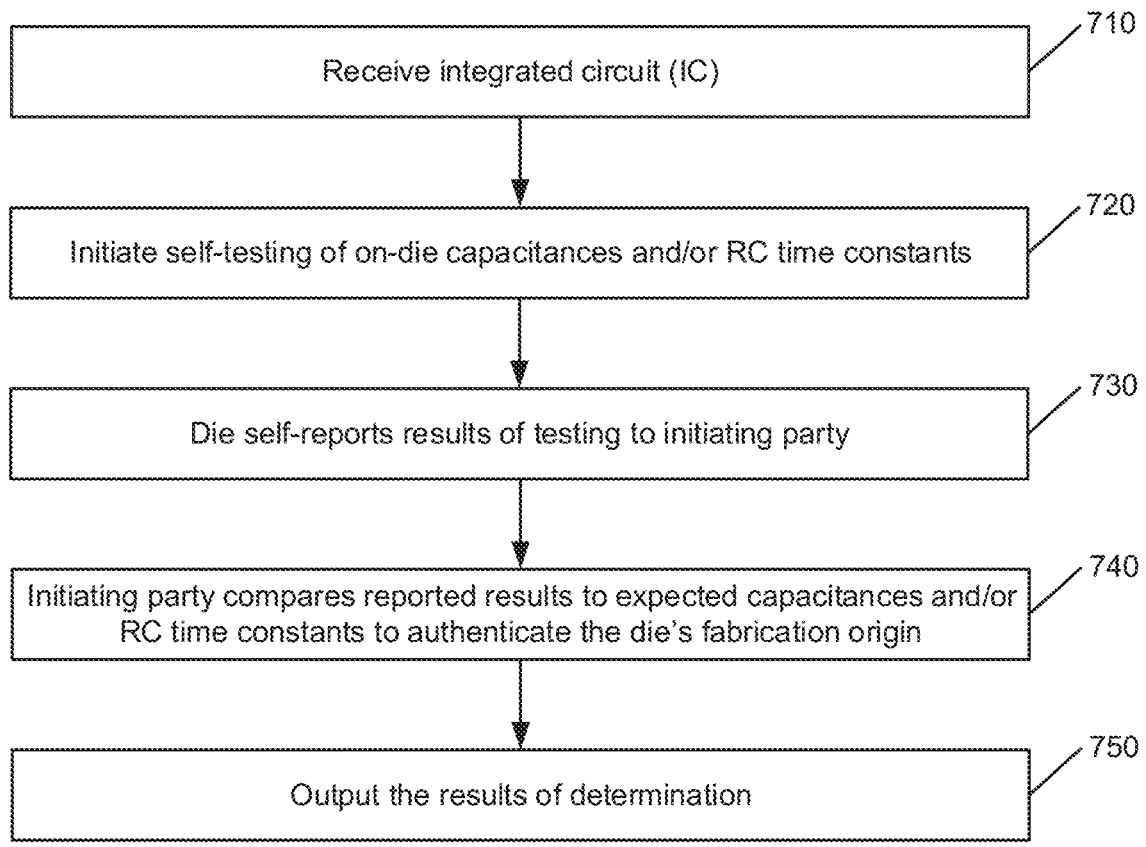
FIG. 7 is an operational flow of an implementation of a method of die authentication using self-reported capacitances and/or RC values.
Figure 10:
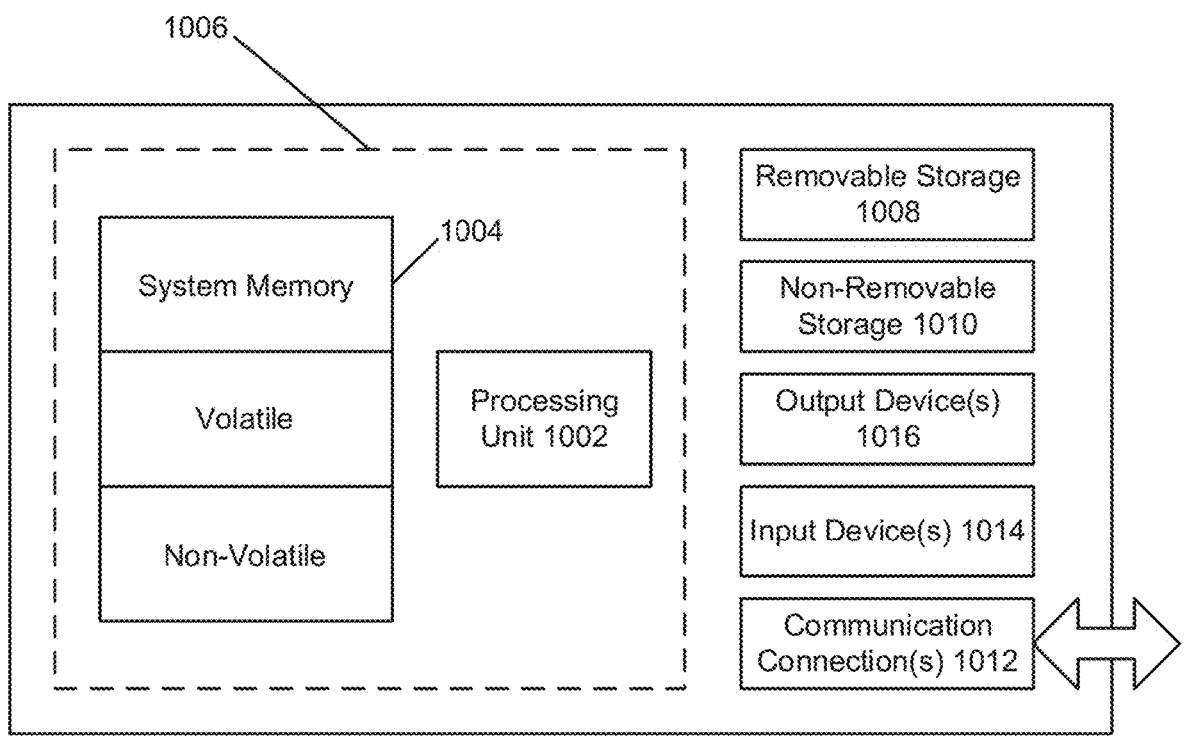
FIG. 10 shows an exemplary computing environment in which example embodiments and aspects may be implemented.

FIG. 7 is an operational flow of an implementation of a method 700 of die authentication using self-reported capacitances and/or RC values. Aspects described herein can be used to authenticate the die. Aspects of the method 700 may be implemented using a variety of computing devices such as smartphones, desktop computers, laptop computers, and tablets. Other types of computing devices may be supported. A suitable computing device is illustrated in FIG. 10 as the computing device 1000.

At 710, an IC is received, e.g., from a fabrication facility. In some implementations, the IC may be received at a test platform. The test platform may be the functional system in which the IC is contained and does not need to be in a laboratory testing environment.

At 720, a self-testing of on-die capacitances and/or RC time constants is initiated on the die.

At 730, the die self-reports the results of the testing to the initiating party. The results may be provided via a computing device accessible to the initiating party.

At 740, the initiating party compares the reported results to expected capacitances and/or RC time constants to authentic the die's fabrication origin. The expected capacitances and/or RC time constants may be maintained in storage and then retrieved or otherwise accessed as needed for the authentication.

The results of the determination performed at 740 are outputted at 750. The results may comprise information directed to whether or not the die's fabrication origin is authentic. The output may be to a computing device, such as the computing device 1000.

In an implementation, a method of die authentication determines with a high degree of certainty that a specific die was produced at a specific fabrication facility. If the design had been fabricated at another fabrication facility, the values reported by the die's self-test would not have matched the table of expected distributions.

Figure 8:
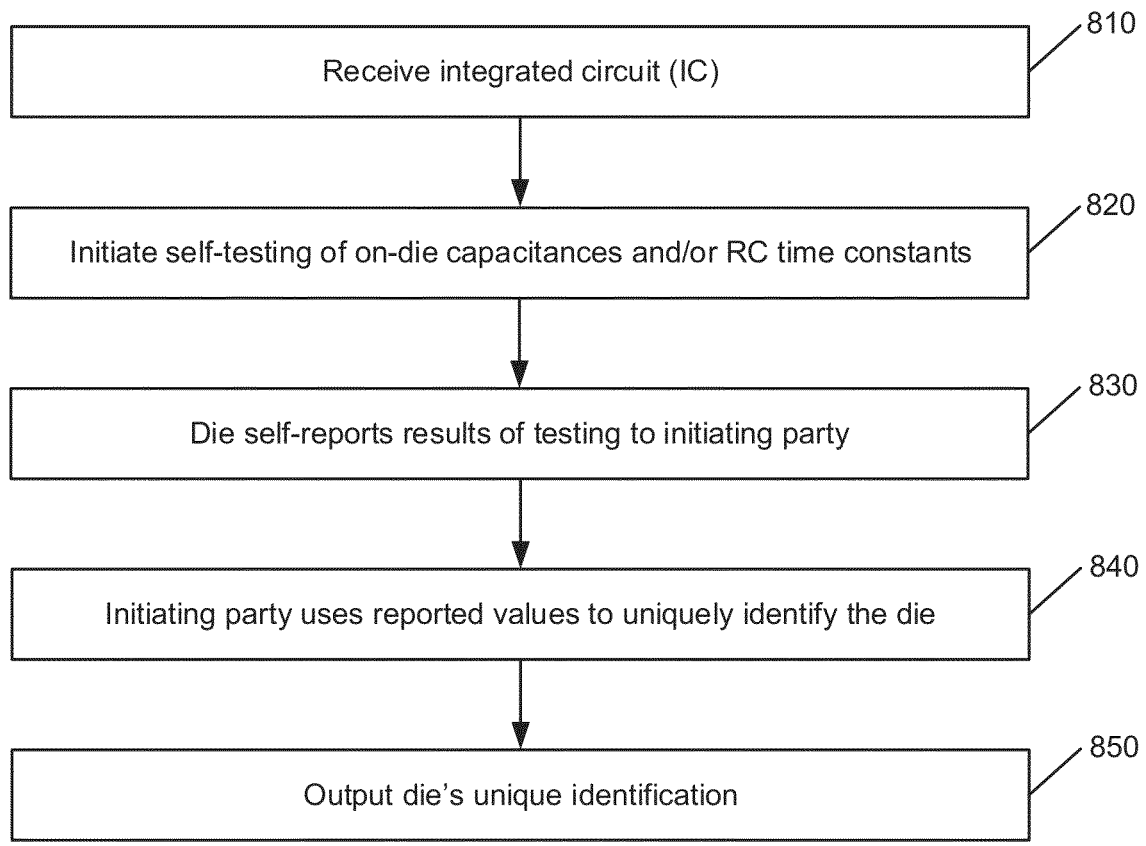
FIG. 8 is an operational flow of an implementation of a method of die identification using self-reported capacitances and/or RC values.

FIG. 8 is an operational flow of an implementation of a method 800 of die identification using self-reported capacitances and/or RC values. Aspects described herein can be used to identify the die. Aspects of the method 800 may be implemented using a variety of computing devices such as smartphones, desktop computers, laptop computers, and tablets. Other types of computing devices may be supported. A suitable computing device is illustrated in FIG. 10 as the computing device 1000.

At 810, an IC is received, e.g., from a fabrication facility. In some implementations, the IC may be received at a test platform. The test platform may be the functional system in which the IC is contained and does not need to be in a laboratory testing environment.

At 820, a self-testing of on-die capacitances and/or RC time constants is initiated on the die.

At 830, the die self-reports the results of the testing to the initiating party. The results may be provided via a computing device accessible to the initiating party.

At 840, the initiating party uses the reported results to uniquely identify the die.

The die's unique identification is outputted at 850. The output may be to a computing device, such as the computing device 1000.

In an implementation, a method of die identification determines with a high degree of certainty that a specific die is the exact one it is expected to be. Once a die is received from the foundry, the die can be queried for its identification and the result of the query can be stored for future reference. Once the die is deployed in the field, it can be queried again to confirm its identity against the stored identification data.

If its response does not match any of the entries in the stored database, then it is likely a black-market or overproduction part.

Figure 9:
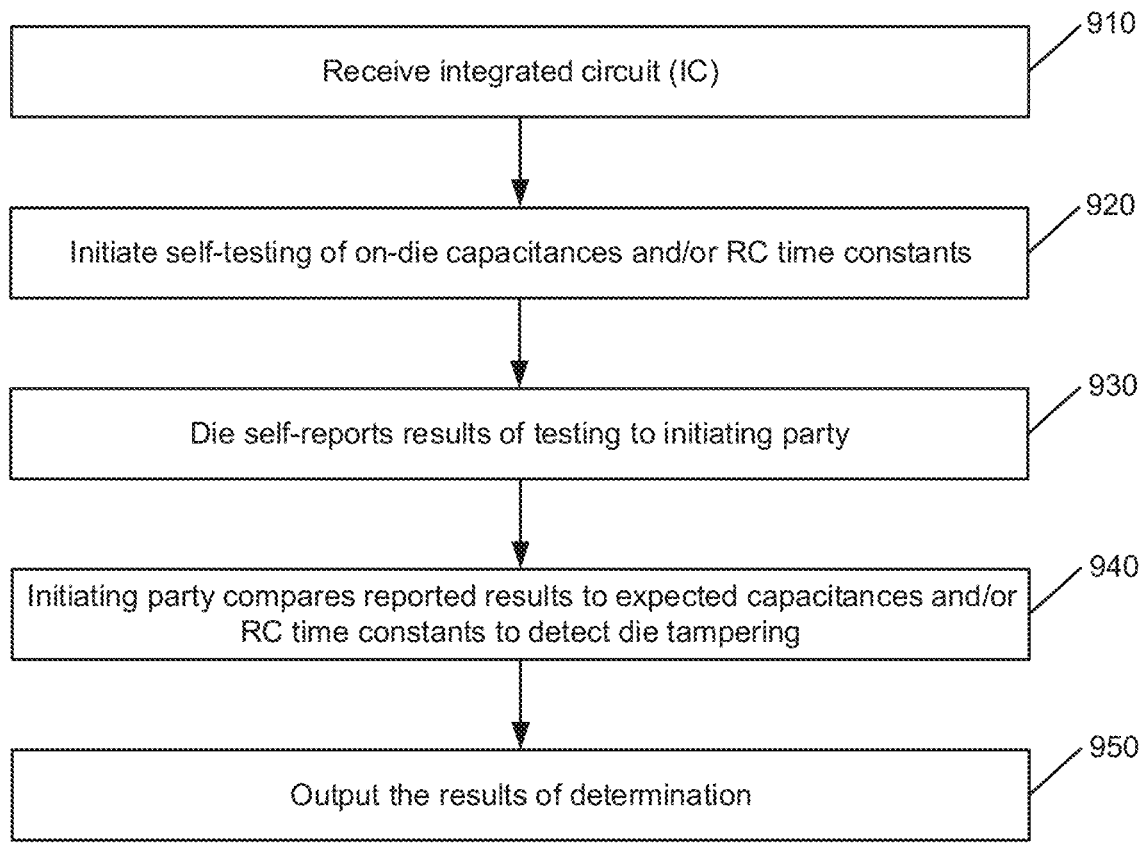
FIG. 9 is an operational flow of an implementation of a method of die tamper detection using self-reported capacitances and/or RC values.

FIG. 9 is an operational flow of an implementation of a method 900 of die tamper detection using self-reported capacitances and/or RC values. Aspects described herein can be used to detect if the die has been tampered. Aspects of the method 900 may be implemented using a variety of computing devices such as smartphones, desktop computers, laptop computers, and tablets. Other types of computing devices may be supported. A suitable computing device is illustrated in FIG. 10 as the computing device 1000.

At 910, an IC is received, e.g., from a fabrication facility. In some implementations, the IC may be received at a test platform. The test platform may be the functional system in which the IC is contained and does not need to be in a laboratory testing environment.

At 920, a self-testing of on-die capacitances and/or RC time constants is initiated on the die.

At 930, the die self-reports the results of the testing to the initiating party. The results may be provided via a computing device accessible to the initiating party.

At 940, the initiating party compares the reported results to expected capacitances and/or RC time constants to detect die tampering. The expected capacitances and/or RC time constants may be maintained in storage and then retrieved or otherwise accessed as needed for the die tamper detection.

The results of the determination performed at 940 are outputted at 950. The results may comprise information directed to whether or not the die has been tampered. The output may be to a computing device, such as the computing device 1000.

In an implementation, a method of die tamper detection determines with a high degree of certainty that a specific die has been unmodified since production. This would mean that the die does not have BEOL modification from Focused Ion Beam (FIB) devices or other such methods of tampering. Likewise, no trojans have been inserted into the die.

In an implementation, a capacitive sensing method comprises: determining at least one of interconnect capacitance, dummy interconnect capacitance, custom added dummy interconnect capacitance, power supply line capacitance, fill cell capacitance, or decoupling capacitance of an IC; and using at least one of interconnect capacitance, dummy interconnect capacitance, custom added dummy interconnect capacitance, power supply line capacitance, fill cell capacitance, or decoupling capacitance of the IC for authentication, identification, or tamper detection.

In some implementations, the method may further comprise detection of IC tampering caused by alteration, insertion, or removal of metal lines, transistors, passive components (such as resistors, capacitors, or inductors), pads, and/or any like IC design primitives using at least one of signal interconnect capacitance, dummy interconnect capacitance, custom added dummy interconnect capacitance, power supply line capacitance, fill cell capacitance, or decoupling capacitance of the IC.

In some implementations, the method may further comprise authentication of a die as being fabricated to the expected process specifications and tolerances with the expected layout that was submitted to the fabrication facility using at least one of signal interconnect capacitance, dummy interconnect capacitance, custom added dummy interconnect capacitance, power supply line capacitance, fill cell capacitance, or decoupling capacitance of the IC.

In some implementations, the method may further comprise using the RC time constant(s) formed from the capacitance(s) and parasitic leakage from attached circuits for authentication, identification, or tamper detection. Switched capacitor charge redistribution may be used to sense the capacitance and RC parasitic leakage time constant, wherein the redistribution generates a voltage waveform that can be sensed with an Analog-to-Digital Converter (ADC).

In some implementations, the method may further comprise using high resolution CDCs to sense the capacitance(s), wherein each CDC accurately measures the absolute capacitance of each subcircuit and/or the relative capacitance between two subcircuits.

An implementation brings metal routing lines closer than recommended by design rules to increase capacitive variation and induce shorts in parallel metal lines to be used for die authentication and identification.

FIG. 10 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices, environments, or configurations may be used. Examples of well known computing devices, environments, and/or configurations that may be suitable for use include, but are not limited to, Personal Computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by the device 1000 and includes both volatile and non-volatile media, removable and non-removable media.

Computer storage media may include volatile and non-volatile, and removable and non-removable media implemented in any method or technology for storage of information such as computer readable instructions, data structures, program modules, or other data. Memory 1004, removable storage 1008, and non-removable storage 1010 are all examples of computer storage media. Computer storage media may include, but is not limited to, RAM, ROM, electrically erasable program read-only memory (EEPROM), flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

In an implementation, a method of die authentication of an IC comprises: performing self-testing of at least one of an on-die capacitance or an RC time constant on a die of the IC to generate self-reported results; receiving the self-reported results from the die at a computing device; and determining whether the die is authentic using the self-reported results and generating a determination.

Implementations may include some or all of the following features. The method further comprises receiving the IC from a fabrication facility. Determining whether the die is authentic using the self-reported results comprises comparing the self-reported results to at least one of expected capacitances or RC time constants to authenticate a fabrication origin of the die. The method further comprises retrieving the at least one of expected capacitances or RC time constants from storage. Comparing the self-reported results to at least one of expected capacitances or RC time constants comprises checking the self-reported results against a table of expected distributions. The method further comprises outputting the determination to an output device. The self-reported results comprise at least one of capacitance or RC time constant values for multiple nodes of the die.

In an implementation, a method of die identification of an IC comprises: performing self-testing of at least one of an on-die capacitance or an RC time constant on a die of the IC to generate self-reported results; receiving the self-reported results from the die at a computing device; and uniquely identifying the die using the self-reported results and generating an identification.

Implementations may include some or all of the following features. The method further comprises receiving the IC from a fabrication facility. The method further comprises outputting the identification to an output device. The method further comprises confirming the identification against stored identification data. Uniquely identifying the die using the self-reported results comprises comparing the self-reported results to at least one of expected capacitances or RC time constants. The self-reported results comprise at least one of capacitance or RC time constant values for multiple nodes of the die.

In an implementation, a method of die tamper detection of an IC comprises: performing self-testing of at least one of an on-die capacitance or an RC time constant on a die of the IC to generate self-reported results; receiving the self-reported results from the die at a computing device; and determining whether the die is tampered using the self-reported results and generating a determination.

Implementations may include some or all of the following features. The method further comprises receiving the IC from a fabrication facility. Determining whether the die is tampered using the self-reported results comprises comparing the self-reported results to at least one of expected capacitances or RC time constants. Comparing the self-reported results to at least one of expected capacitances or RC time constants comprises checking the self-reported results against a table of expected distributions. The method further comprises retrieving the at least one of expected capacitances or RC time constants from storage. The method further comprises outputting the determination to an output device. The self-reported results comprise at least one of capacitance or RC time constant values for multiple nodes of the die.

As used herein, the singular form "a," "an," and "the" include plural references unless the context clearly dictates otherwise.

As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It should be understood that the various techniques described herein may be implemented in connection with hardware components or software components or, where appropriate, with a combination of both. Illustrative types of hardware components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of die authentication of an integrated circuit (IC), the method comprising:
    performing self-testing of at least one of an on-die capacitance or a resistor capacitor (RC) time constant on a die of the IC to generate self-reported results;
    receiving the self-reported results from the die at a computing device; and
    determining whether the die is authentic using the self-reported results and generating a determination.

2. The method of claim 1, further comprising receiving the IC from a fabrication facility.

3. The method of claim 1, wherein determining whether the die is authentic using the self-reported results comprises comparing the self-reported results to at least one of expected capacitances or RC time constants to authenticate a fabrication origin of the die.

4. The method of claim 3, further comprising retrieving the at least one of expected capacitances or RC time constants from storage.

5. The method of claim 3, wherein comparing the self-reported results to at least one of expected capacitances or RC time constants comprises checking the self-reported results against a table of expected distributions.

6. The method of claim 1, further comprising outputting the determination to an output device.

7. The method of claim 1, wherein the self-reported results comprise at least one of capacitance or RC time constant values for multiple nodes of the die.

8. A method of die identification of an integrated circuit (IC), the method comprising:
    performing self-testing of at least one of an on-die capacitance or a resistor capacitor (RC) time constant on a die of the IC to generate self-reported results;
    receiving the self-reported results from the die at a computing device; and
    uniquely identifying the die using the self-reported results and generating an identification.

9. The method of claim 8, further comprising receiving the IC from a fabrication facility.

10. The method of claim 8, further comprising outputting the identification to an output device.

11. The method of claim 8, further comprising confirming the identification against stored identification data.

12. The method of claim 8, wherein uniquely identifying the die using the self-reported results comprises comparing the self-reported results to at least one of expected capacitances or RC time constants.

13. The method of claim 8, wherein the self-reported results comprise at least one of capacitance or RC time constant values for multiple nodes of the die.

14. A method of die tamper detection of an integrated circuit (IC), the method comprising:
    performing self-testing of at least one of an on-die capacitance or a resistor capacitor (RC) time constant on a die of the IC to generate self-reported results;
    receiving the self-reported results from the die at a computing device; and
    determining whether the die is tampered using the self-reported results and generating a determination.

15. The method of claim 14, further comprising receiving the IC from a fabrication facility.

16. The method of claim 14, wherein determining whether the die is tampered using the self-reported results comprises comparing the self-reported results to at least one of expected capacitances or RC time constants.

17. The method of claim 16, wherein comparing the self-reported results to at least one of expected capacitances or RC time constants comprises checking the self-reported results against a table of expected distributions.

18. The method of claim 16, further comprising retrieving the at least one of expected capacitances or RC time constants from storage.

19. The method of claim 14, further comprising outputting the determination to an output device.

20. The method of claim 14, wherein the self-reported results comprise at least one of capacitance or RC time constant values for multiple nodes of the die.

* * * * *